Oct. 20, 1936.  L. NEUMANN  2,058,096
MEANS FOR AUTOMATICALLY RECORDING AND REPRODUCING TELEPHONIC MESSAGES
Filed May 27, 1932  6 Sheets-Sheet 1

Oct. 20, 1936.    L. NEUMANN    2,058,096
MEANS FOR AUTOMATICALLY RECORDING AND REPRODUCING TELEPHONIC MESSAGES
Filed May 27, 1932    6 Sheets-Sheet 2

Oct. 20, 1936.  L. NEUMANN  2,058,096
MEANS FOR AUTOMATICALLY RECORDING AND REPRODUCING TELEPHONIC MESSAGES
Filed May 27, 1932   6 Sheets-Sheet 3

Inventor
Leopold Neumann
By B. Singer, atty.

Oct. 20, 1936.　　　L. NEUMANN　　　2,058,096
MEANS FOR AUTOMATICALLY RECORDING AND REPRODUCING TELEPHONIC MESSAGES
Filed May 27, 1932　　　6 Sheets-Sheet 4
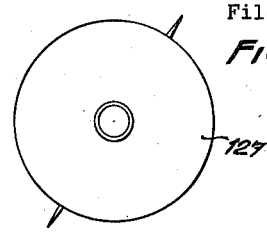
FIG. 9.
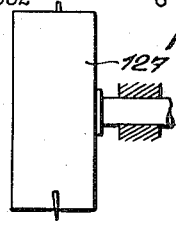
FIG. 10.
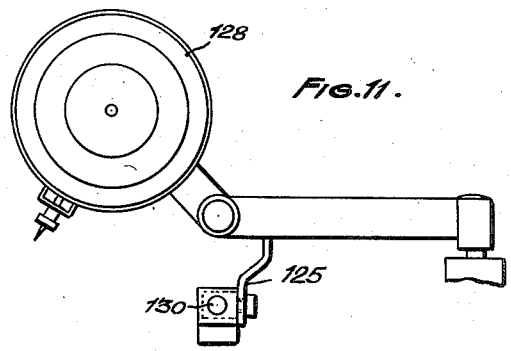
FIG. 11.
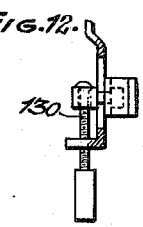
FIG. 12.
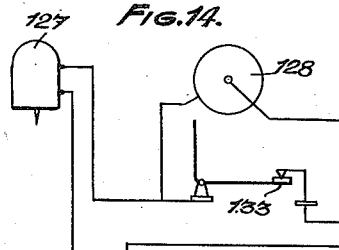
FIG. 14.
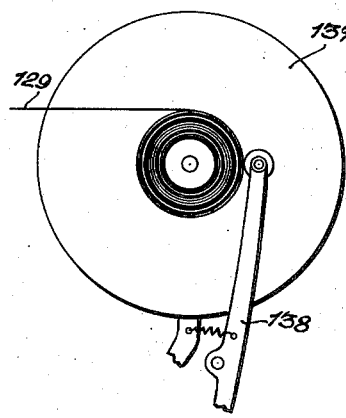
FIG. 13.
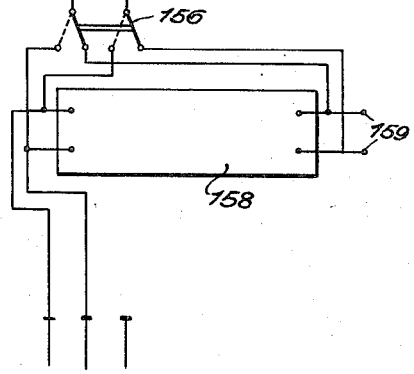
Inventor
Leopold Neumann
By B. Singer, Atty.

Oct. 20, 1936.                L. NEUMANN                2,058,096
MEANS FOR AUTOMATICALLY RECORDING AND REPRODUCING TELEPHONIC MESSAGES
              Filed May 27, 1932            6 Sheets-Sheet 5
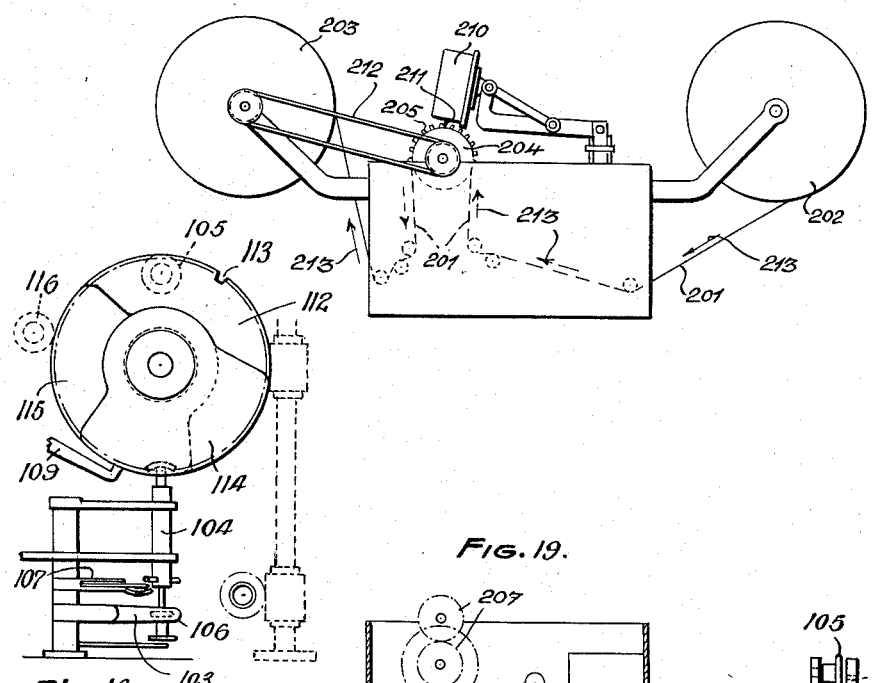
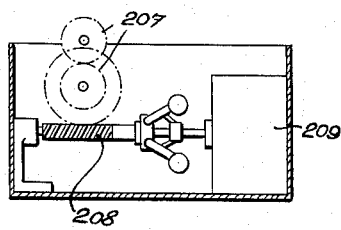
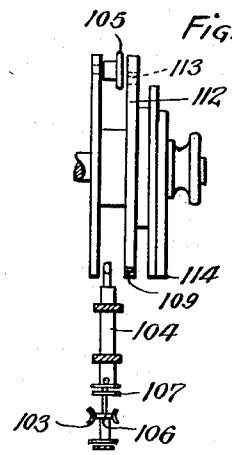
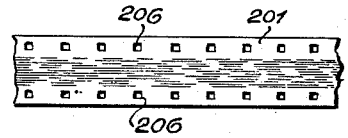

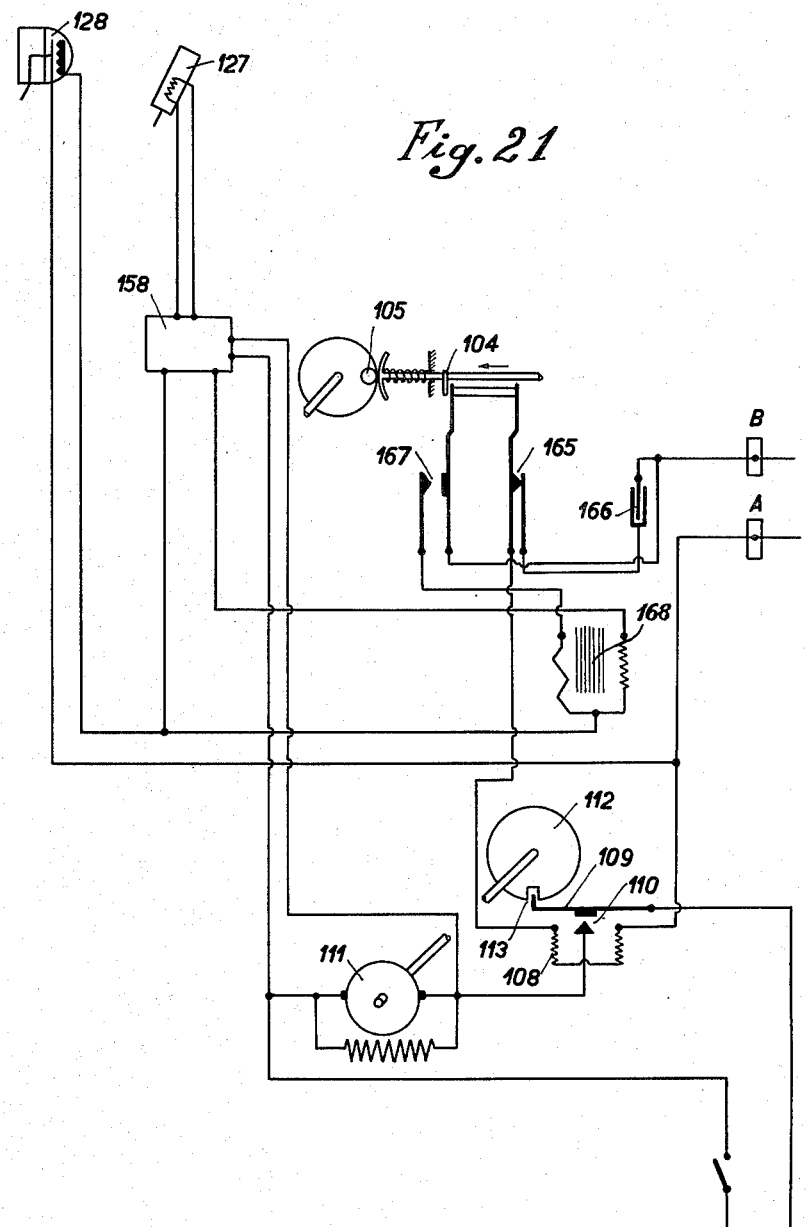

Patented Oct. 20, 1936

2,058,096

UNITED STATES PATENT OFFICE 2,058,096

MEANS FOR AUTOMATICALLY RECORDING AND REPRODUCING TELEPHONIC MESSAGES

Leopold Neumann, Vienna, Austria, assignor to Telefonograf - Patentverwertungs - Gesellschaft m. b. H., Vienna, Austria, an Austrian company Application May 27, 1932, Serial No. 613,975
In Austria October 15, 1931

10 Claims. (Cl. 179—6)

This invention relates to means for automatically recording and reproducing telephonic messages or conversations in which the transmitting alarm current operates a motor at the receiving end which in turn operates a recording device with coupled sound waves carriers for reproduction and recording, said device telephoning the message of the called person to the calling person and being disengaged automatically after the delivery of the message. The essential feature of the present invention consists in that after the delivery of the message, the recording box or pick-up is placed onto the sound waves carrier for recording, which rotates for a certain time, and after the elapse of this time is lifted off the said carrier. Further this invention relates to means for recording and reproducing sounds particularly in the case of apparatus for the automatic recording and reproduction of telephone messages but also for dictating apparatus and for all apparatus for recording and occasionally reproducing spoken words, music or other sounds. Further the invention is particularly suited for long speeches in parliament which at a later time are broadcast or for recording examinations at courts, police stations or other authorities. In this case a band is used as a sound waves carrier on which for the better utilization of the recording space the records are made successively in parallel rows, said band preferably consisting of gelatine.

The accompanying drawings show by way of example one embodiment of the apparatus of the present invention.

Figure 1:
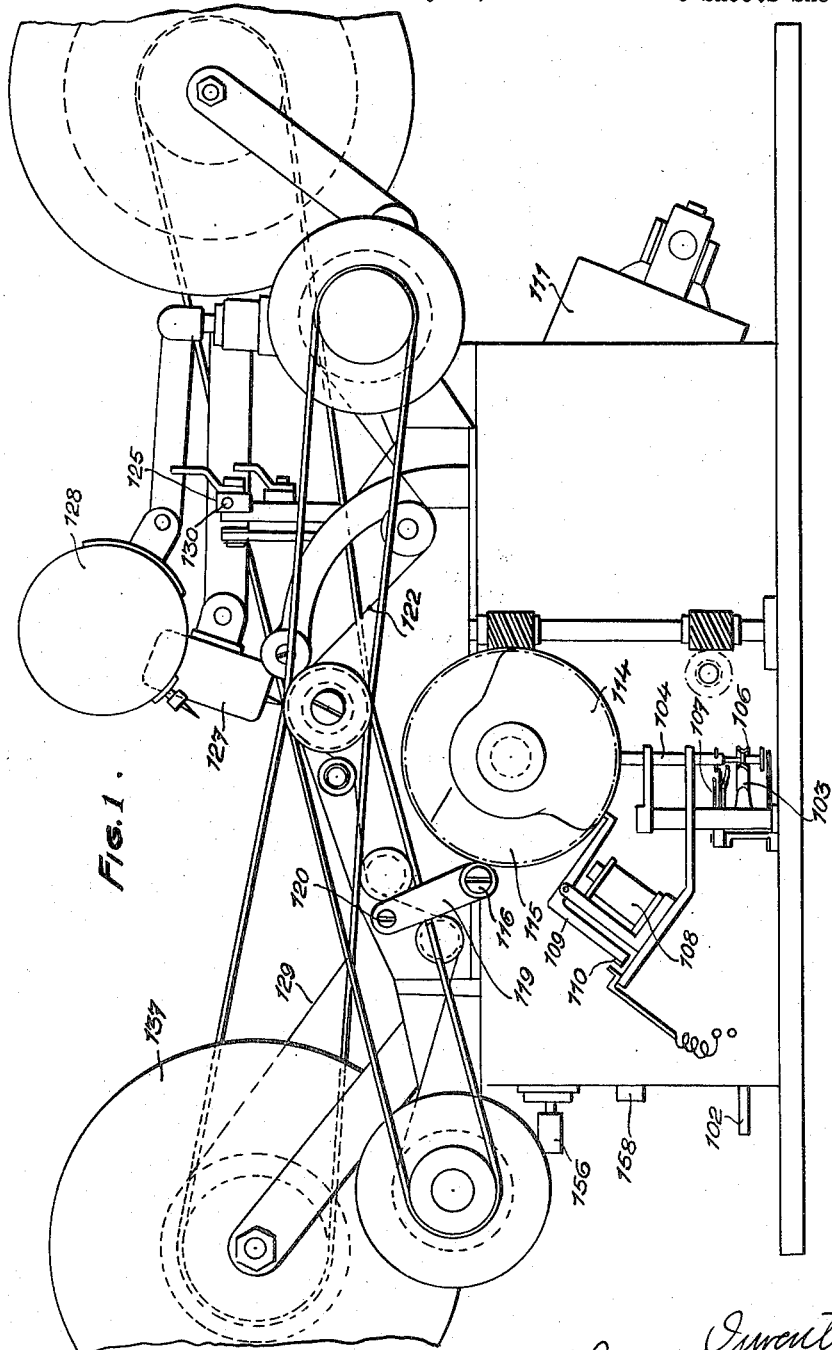
Figure 2:
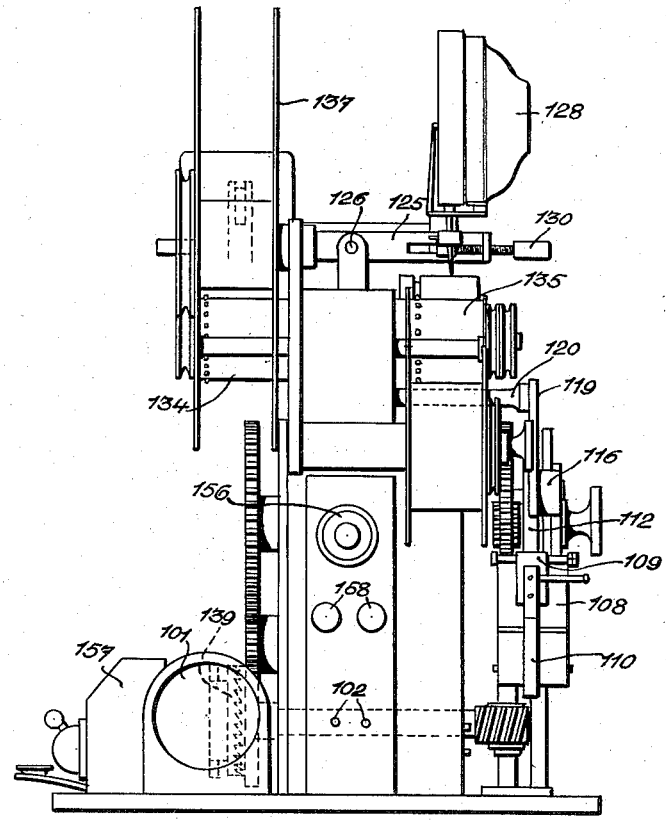
Figure 15:
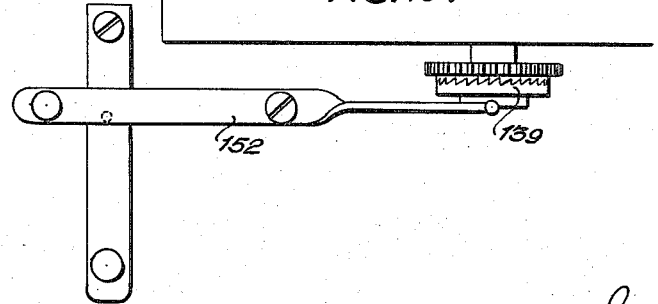
Figure 3:
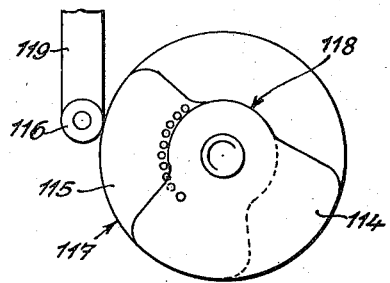
Figure 4:
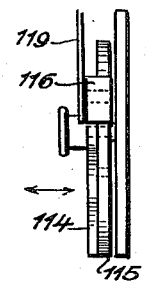
Figure 5:
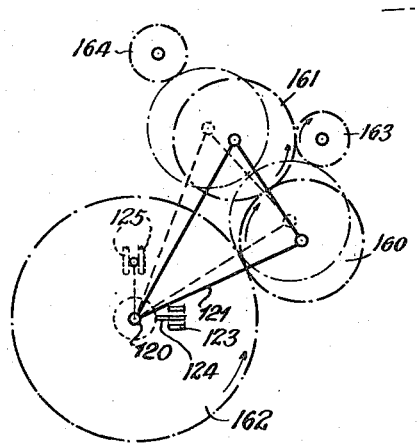
Figure 6:
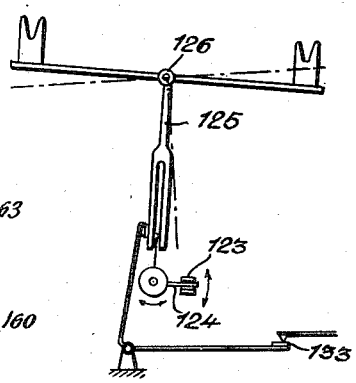
Figure 7:
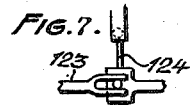
Figure 8:

Fig. 1 is a side view and Fig. 2 a front view of the apparatus for recording and reproducing telephonic messages. Figs. 3 and 4 show an operating cam in plan view and in side view respectively. Fig. 5 is a diagrammatic view of the change speed gear. Fig. 6 is a view of the means for operating the microphone switch. Fig. 7 is a side view of an angle lever. Fig. 8 shows the recording band in the initial position. Figs. 9 and 10 show the pick-up with recording and reproducing styles in plan view and side view respectively. Fig. 11 shows the construction of the alarm member and Fig. 12 the means for the lateral movement of the alarm member. Fig. 13 is a view of the band-drum with feelers. Fig. 14 shows a connection diagram. Fig. 15 shows a coupling member. Figs. 16 and 17 show an operating member in front view and side view respectively. Figs. 18 and 19 show a further construction of the apparatus in side view and cross section respectively. Fig. 20 is a plan view of the tape-like sound waves carrier and Fig. 21 shows a wiring diagram which illustrates the operation of the apparatus.

At the receiving station, the apparatus according to the present invention may be connected either in place of the telephone or parallel thereto, this being performed by means of a plug or throw-over switch.

In the illustrated construction, the connection is carried out by a multiple plug 101. Further a connection 102 to a local source of current is provided, for instance lighting or power networks, a storage battery or the like. Also the amplifier can be fed by this source of current. Springs 103 serve for changing from alarm circuit to speaking circuit in known manner. The springs in a telephone apparatus of usual construction are operated by lifting off the hand-set, while according to the present construction the springs are operated by an operating rod 104, the upper end of which is depressed by a roller 105 in the inoperative position. The bottom end of this operating rod carries a cone-shaped insulating member 106 which in the depressed position drives apart said springs, so that the alarm circuit is closed. However in the raised position of the member 106 the springs return into their initial position, whereby the speaking circuit is closed and the alarm circuit is interrupted. At the same time the operating rod 104 controls a switch 107 which connects the amplifier current during the upward movement of the operating rod. The alarm of the caller sends current impulses into a relay 108. The same attracts its armature 109, which in turn closes the contacts 110 of the motor circuit. The motor 111 is operated and by means of toothed and worm wheels rotates an operating member in the shape of an operating disc 112 which is provided with a notch 113, engaged by the armature 109 of the relay 108 in the position of rest (Figs. 16 and 17). At the beginning of the rotation of the motor 111 and thus of the operating disc 112, the armature 109 of the relay 108 co-operates with the solid part of the operating disc and thus places in circuit the contact 110 of the motor circuit for the term of a revolution of said disc 112. The operating roller 105, which also is secured to the operating disc and in its position of rest depresses the operating rod 104, releases the operating rod 104 after the operating disc commences to rotate, whereby the springs 103 are operated, which now disconnects the alarm circuit and thus the relay and connects the speaking circuit. At the same time the contact 107 of the amplifier circuit has been closed during upward movement of the rod 104. A two-part cam is mounted on the shaft of the operating disc 112, the part 114 of said cam being rotatable with respect to the fixed part 115. The operation face of said cam consists of two parts, namely the outer track 117 and the inner track 118, the lengths of said tracks being adjustable by turning the movable part 114 of the cam. An operating roller 116, mounted in a rocking lever 119, slides on the operating face of said cam. The fixed part 115 of the operating cam is disposed in such manner that, at the start of the rotation of the motor, the operating roller 116 passes from the outer track 117 to the inner track 118 of the operating face of the cam. Thereby the rocking lever 119 turns a shaft 120 and thus a link 121 of the change gear shown in Fig. 5. The link 121 carries the gears 160, 161 which are in mesh with each other. The gear 160 is driven by the gear 162 which in turn is driven by the motor. In the position of the link 121 which is indicated by solid lines in Fig. 5 the gear 162 drives by means of the gears 160, 161 the gear 163 for driving the operating roller of the speaking-band. The gear 164 which is coupled with the operating roller of the recording-band, however, remains stationary, because in this position of the link 121 it is not engaged by any one of the driving gears. The arrows indicate the direction of rotation of the gears 160 to 163. If now, after the delivery of a message to a caller, the shaft 120 performs the described rocking movement, the link 121 moves hereby in the dotted line position (Fig. 5). The gear 160, which is driven by the gear 162, is hereby brought directly in engagement with the gear 163—cutting out the gear 161—and drives this gear 163 in the opposite direction. This reverse rotation of the gear 161 causes a reverse movement of the speaking band. During the change of the link 121 from the solid line position into the dotted line position, the gear 161 is moved into engagement with a gear 164, so that now the operating roller of the recording band is driven. However by the rotation of the shaft 120, the connection lever 123 moved upward and the cranked lever 124 has been turned, which rotates the bearing 125 of the pick-up 127 and microphone 128 about the pivot 126, so that the pick-up is lifted away from the recording and reproducing band 129, while the microphone is placed onto the speaking band 122. Simultaneously the contact 133 is opened which short-circuits the microphone during the running of the recording and reproducing band 129. The speaking band 122 contains a number of parallel sound wave grooves for different messages. The microphone 128 can be set to the desired message by means of a micrometer screw 130. The pick-up 128 comprises a sound box, which is connected with the microphone by air-coupling. Now the message recorded on the band is transmitted to the caller. The length of the inner track 118 of the operating face of the cam is such that, simultaneously the message on the band has been delivered, the operating roller 116 has reached the end of the inner track and passes onto the outer track 117 of the operating face of the cam during the further rotation of the latter. Thereby the operating roller moves outward and this movement is transmitted by the rocking lever 119 to the shaft 120, which in turn moves the link 121 into the other extreme position. In this position of the link, the operating roller 134 for the recording and reproducing band 129 is rotated, while the direction of rotation of the operating roller 135 for the speaking band 122 is reversed by the action of the change gear. In view thereof, the speaking band is again wound up on the roller. The feed perforations of the speaking band have been replaced by a longitudinal recess 122ᵃ as shown in Fig. 8 so that the band is not fed in the initial position, this being made in order to avoid a mechanism of complicated construction which would necessitate the disconnection of the operation of the roller 135 in the initial position of the speaking band. The movement of the operating roller 116 from the inner track to the outer track of the operating face and thus the rotation of the link effects the downward movement of the transmission lever 123, a rotation of the cranked lever and in connection with it, the bearing 125 for the pick-up and microphone is rocked into the other extreme position. Thereby the microphone 128 is lifted away from the speaking band and the pick-up 127 is placed onto the recording and reproducing band 129, so that now the incoming message can be recorded. Owing to the rocking of the bearing 125, also the switch 133 is operated so that the microphone 128 remains short-circuited during the recording or a resistance is connected in its place. In view of this provision any annoying noises, for instance the talk of people who are in the same room during the recording, which are received by the microphone do not pass into the pick-up, because the recorded message would be distorted. The recording and reproducing band moves for so long until the recess 113 of the operating disc 112 again returns into the initial position, e. g. until the operating disc has completed one revolution. The armature 109 is released, drops off and thereby interrupts the contact 119 of the motor-circuit. In this position also the operating roller 105 runs up the top end of the operating rod 104 and depresses the same. The springs 103 are driven apart by the cone-shaped insulating member 106 and thus connects the relay 108 into the alarm circuit, while it disconnects the speaking circuit.

The operation of the apparatus will now be described with reference to Fig. 21 which shows a wiring diagram of the novel parts of the invention. The alarm current of the calling party enters the apparatus at A, energizes the relays 108 and returns over the normally closed contact 165 of the spring switch and the condenser 166 of the other side of the circuit at B. The relays 108, when energized, attract the armature 109 and close the contact 110, whereby the motor 111 and the amplifier 158 are connected with their source of current, for instance with a power supply line. Owing to the energization of the relays 108, the end of the armature 109 has been moved out of the notch 113 in the disc 112 and engages the circumference of this disc 112, which is now rotated by the motor 111, preferably by means of a gearing. The armature 109 cannot open the contact 110 until the disc 112 has made a complete revolution and the notch 113 has returned to its initial position. At the beginning of the revolution of the disc 112 the roller 105 moves away from the slidable member of the operating rod 104, so that the latter is moved in the direction of the arrow due to the action of the resilient spring members. This causes an opening of the contact 165 in the relays circuit and a closing of the contact 167, which connects the speaking line with the microphone of the sound box 128 and with the primary winding of the input transformer 168 for the amplifier 158. After a complete revolution of the disc 112 the armature 109 of the relays 108, which meantime has become de-energized, drops into the notch 113 and thereby the contact 110 of the motor circuit and the amplifier circuit is opened. The roller 105 again engages the head of the operating rod 104 and returns the same and the spring members into their initial position. The apparatus is thus again ready for another call.

The caller receives when the relays 108 has been set in operation and the other parts are functioning, a message from the called station, that the person called is not present, but that the message which the caller desires to give will be recorded for phonetic reproduction. In some cases it is sufficient if one message only is transmitted to the caller without its being necessary or desirable to make a record. In such case the operation of the recording and reproducing band is interrupted and the corresponding drive is disconnected, for instance by disconnecting the driving roller with the teeth by an axial coupling. In case a stereotypical message which calls for no answer is given by the alarm pick-up, for instance "Mr. N. N. will be away for a fortnight, his deputy is Mr. X. Y. of the following address . . .". Now the recording receiving mechanism is connected and remains in operation until the operating disc 112 has returned to its original position. Simultaneously the message-band is wound back and in this way returns into the initial position for the next call.

After one revolution of the operating disc which lasted for a certain predetermined time and after the elapse of which the whole mechanism returned into the initial position, the relay is disconnected and the apparatus is ready for the next call. The coupling 139 is operated whereby the operating mechanism is disengaged, if it is desired to hear the recorded messages. Now the switch 156 is operated which connects the pick-up to the admission end of an amplifier for strengthening the speaking currents, while up to now said pick-up was connected to the outlet end of said amplifier. A head-receiver or loudspeaker is connected to the outlet end of the amplifier. Now if the recording band is wound back to that place where the speaking grooves are present and the style is placed onto the sound waves record, the apparatus can be set in motion and the recorded message is audibly reproduced by actuating the switch 157, which connects the motor-circuit as well as the amplifier-circuit.

The described arrangement may be used also for dictating machines.

The record carrier shown in Figs. 18 to 20 consists of a band 201, which is wound off a roller 202 and wound up a roller 203. The band is fed by a feed roller 204 such as used for film-apparatus and a toothed wheel 205, engaging the perforations 206 of the band 201. Toothed wheels may be arranged at both sides of the feed roller 204 and at both borders of the band 201 to engage the perforations of the latter and cause a uniform feed of the band. The feed roller 204 is driven by way of a train of toothed wheels 207 from a worm shaft 208, driven by a motor 209.

The pick-up 210 rests on the band 201 and with its style 211 bears on the feed roller 204. The style 211 directly rests on the record-band. The winding up roller 203 is rotated by an endless band 212 for instance an endless spiral spring passing round the feed roller 204. By means of a motor 209, the band is continuously rotated in the direction of the arrows 213, while at the same time the sound impulses, intensified in any convenient manner, are passed to the style of the pick-up, whereby sound wave curves are cut in known manner in the band which at any time can be reproduced by the same arrangement for instance amplified by means of a loudspeaker-set.

The principal advantage of the present invention consists in that any lateral movement of the pick-up can be dispensed with if a band is used as sound waves carrier, while the feed of the latter is greatly simplified and rendered reliable. The usual shaft-guidances and connections for a reciprocation of the pick-up or sound waves carrier are not necessary. Also the space is very favorably utilized because the band is very thin as only the surface is used for the arrangement of the sound wave curves.

Space is greatly utilized if messages are recorded at both sides of the band. After recording messages along on length of the band, the pick-up or the band is shifted for slightly more than the width of the sound wave curves, so that all large number of sound wave curves can be arranged parallel side by side.

An essential feature of the present invention consists in that the band, specially used for spoken messages, is made of gelatine. Heretofore gelatine-bands were not used because when used for talkies they had to be developed thus treated with solutions which they do not withstand owing to their water-solubility, while the band according to the present invention is ready for reproduction directly after recording without any special treatment. Further it is known to use gelatine for circular records or rollers, but it is new to use gelatine in the form of a band or tape, whereby it is found that it possesses sufficient tensile strength and toughness. The use of gelatine in the form of a band or tape only constitutes the base for arrangement for automatically recording and reproducing sounds, because only by the band is warranted the necessary capacity and gelatine is the only material which can be used. Cellon or celluloid is too hard.

What I claim is:

1. Apparatus for automatically recording and reproducing telephonic messages, comprising a speaking band and a recording band, a separate sound-box associated with each of the said bands, means operated in dependence on the receipt of a call for setting the said speaking band in motion and conducting the same past the sound-box associated therewith, means for returning the said speaking band into its initial position after it is run off, means adapted, after the running off of the said speaking band, to set the said recording band in motion and at the same time to operate a changeover switch adapted to switch the sound-box associated with the speaking band off the speaking line and in its place to switch in the sound-box associated with the recording band, and a controlling member operated by the driving motor of the apparatus and adapted to bring the apparatus to a standstill after a pre-determined period of time.

2. Apparatus as claimed in claim 1, in which the said controlling member consists of a disc driven by the motor of the apparatus, the said disc having a peripheral recess adapted to be engaged automatically, when the apparatus is at a standstill, that is to say when the motor circuit is interrupted, by the end of a member associated with the switch controlling the current circuit of the said motor, the said end being adapted, on the starting up of the said motor, to come out of engagement with the said recess and to bear against the periphery of the said disc until the said disc has carried out a complete revolution, and then to engage once more in the said recess and thereby to interrupt the motor circuit by means of the switch associated with it.

3. Apparatus as claimed in claim 1, in which the element adapted to control the said means for returning the speaking band into its initial position after running off, and which at the same time constitutes the said controlling member which, after the running off of the speaking band, sets the recording band in motion and simultaneously operates a change-over switch adapted to switch the sound-box associated with the speaking band off the speaking line and in its place to switch into the said line the sound-box associated with the recording band, consists of a cam driven by the motor of the apparatus, the camming face of which includes a pair of elements adjustable one with respect to the other to vary the length of said camming face as may be required for the respective band moving means.

4. Apparatus as claimed in claim 1, in which the controlling element is a cam, the camming face of which includes a pair of elements adjustable one with respect to the other to vary the length of said camming face as may be required for the respective band moving means, said elements of the cam comprising two segments arranged side by side.

5. Apparatus as claimed in claim 1, including means to short-circuit one of the sound boxes during the operation of the other in connection with its associated band.

6. Apparatus as claimed in claim 1, in which one of the bands is provided with parallel rows of grooves for different messages and including means to adjust the associated sound box or pick-up to register the stylus thereof with any of the grooves.

7. Apparatus as claimed in claim 1, in which one of the bands is provided with parallel rows of grooves for different messages and including means to adjust the associated sound box or pick-up to register the stylus thereof with any of the grooves, said adjusting means comprising a micrometer rod having a nut and a screw engageable by said nut.

8. Apparatus as claimed in claim 1, including operating means actuated by said controlling member, a pair of make and break sets actuated by said means, one of said sets being interposed in the calling circuit and adapted to interrupt this circuit when actuated and the other set being interposed in the speaking circuit and adapted to close this circuit when actuated, and a spring to yieldingly resist the movement of said means in one direction.

9. Apparatus as claimed in claim 1, further including means for temporarily disconnecting the said recording means independently of the said speaking means.

10. Apparatus as claimed in claim 1, in which one of the bands is made of gelatine.

LEOPOLD NEUMANN.